United States Patent Office 3,468,723
Patented Sept. 23, 1969

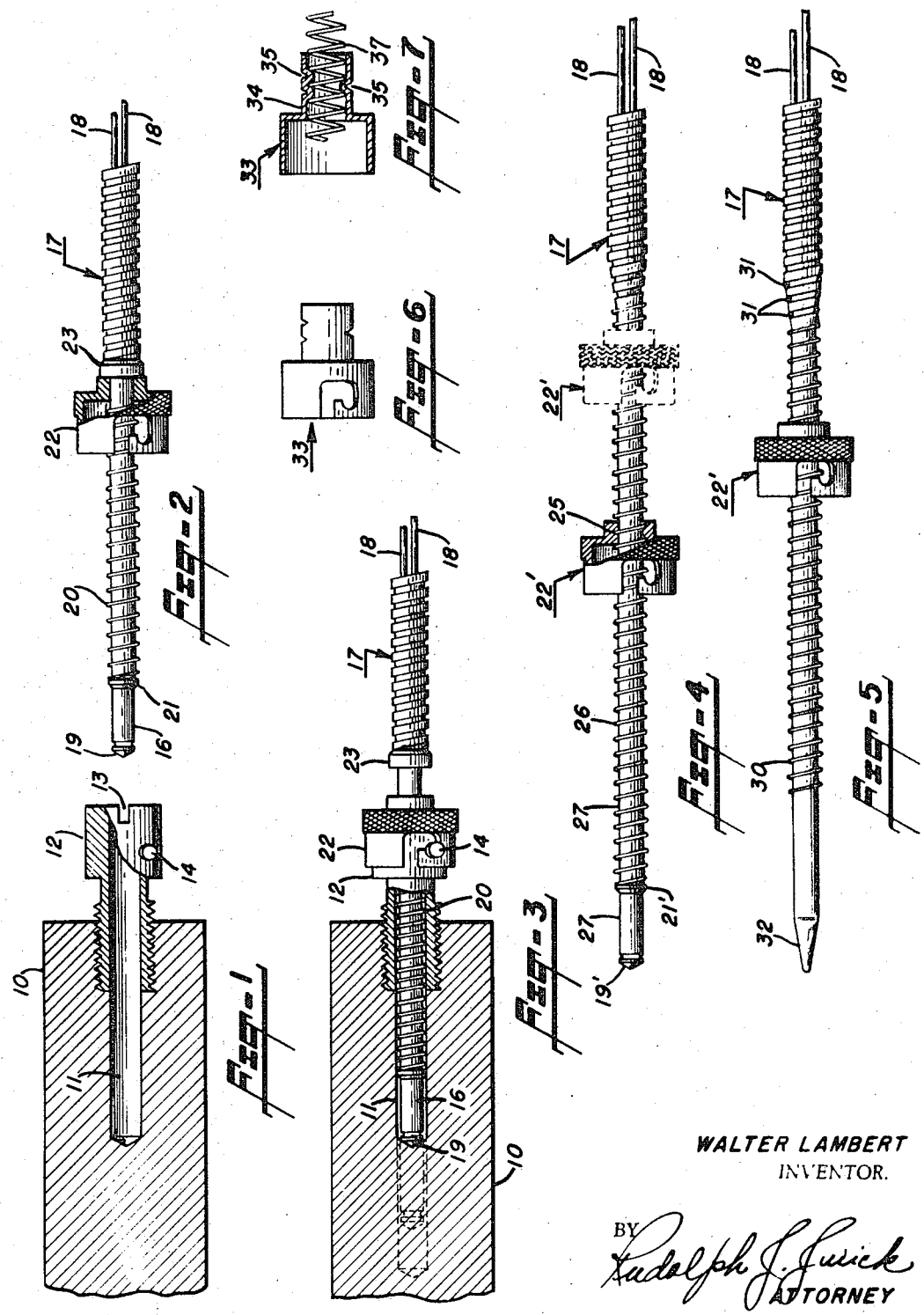

3,468,723
SPRING-LOADED THERMOCOUPLE
Walter Lambert, Westport, Conn., assignor to Thermo Electric Co., Inc., Saddle Brook, N.J., a corporation of New Jersey
Filed Nov. 21, 1966, Ser. No. 595,952
Int. Cl. H01v 1/06
U.S. Cl. 136—221                            9 Claims This invention relates to thermocouples and more particularly to a spring-loaded thermocouple.

A spring-loaded thermocouple includes a spring-biased, bayonet cap for securing the thermocouple to a cooperating fitting, thereby to position the hot junction of the thermocouple in operative position within a bore formed in a mounting member for the purpose of measuring and/or controlling temperature. In practice, the depth of the bore varies, depending upon a desired couple-immersion length, and it is advantageous to have the end, or hot junction, of the thermocouple pressed into firm engagement with the wall defining the bottom of the bore. In spring-loaded thermocouples as made heretofore, a coiled spring is confined between the bayonet cap and an enlarged-diameter portion formed at the hot junction end of the thermocouple or at some point on the outer shell. In such construction, the spring has fixed maximum and minimum lengths. In consequence, a particular spring-loaded thermocouple has a limited range of immersion lengths. This limitation restricts the number of specific appications to which the thermocouple may be adapted by the user and requires the manufacturer to carry a large stock of thermocouples which differ only by specified ranges of immersion lengths.

A spring-loaded thermocouple made in accordance with this invention utilizes the coiled spring as a thread for the bayonet cap, thereby increasing significantly the range of immersion lengths. Also, the relative position of the cap on the spring may be adjusted by the user to provide a desired biasing force to retain the cap securely coupled to the cooperating fitting. Further, the spring can be of a reduced axial length with one end anchored to the thermocouple shell and the other end free and spaced a considerable distance from the hot junction, thereby minimizing adverse effects upon the spring at high temperatures.

An object of this invention is the provision of a spring-loaded thermocouple of improved construction and having an extended range of immersion lengths.

An object of this invention is the provision of a spring-loaded thermocouple in which the spring is utilized as a thread for the bayonet cap.

An object of this invention is the provision of a spring-loaded thermocouple comprising a coiled spring carried by the shell of the thermocouple, means anchoring one end of the spring to the shell, and a bayonet cap having an internal thread portion operatively engaging one or more convolutions of the spring.

These and other objects and advantages of the invention will become apparent from the following description when taken in conjunction with the accompanying drawings illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a cross-sectional view showing a mounting block carrying a threaded adapter for receiving a spring-loaded thermocouple;

FIGURE 2 shows a spring-loaded thermocouple of conventional construction, with a portion of the bayonet cap shown in cross-section;

FIGURE 3 shows this thermocouple connected to the mounting block in operative position;

FIGURE 4 is similar to FIGURE 2 but showing a spring-loaded thermocouple made in accordance with one embodiment of this invention;

FIGURE 5 shows a spring-loaded thermocouple made in accordance with another embodiment of this invention;

FIGURE 6 is a side elevational view of a drawn metal bayonet cap; and

FIGURE 7 is a central cross-sectional view thereof and including a portion of the spring.

Reference now is made to FIGURE 1, wherein there is shown a mounting block 10 having a bore 11 formed therein, said bore terminating in an internally-threaded portion into which is threaded a fitting, or adapter, 12. This fitting has an enlarged-diameter head which may have a hexagonal configuration, or provided with a screw slot 13, to facilitate threading the fitting into position. A radially-extending coupling pin 14 is secured to the head and the through hole of the fitting matches the bore 11.

A spring-loaded thermocouple, of conventional construction, is shown in FIGURE 2. Such thermocouple comprises a metal, outer shell 16 having a flexible sheath 17 secured to one end thereof. A pair of insulated thermocouple wires 18 extend through the sheath and the shell and have their bare ends joined together, as by silver solder, to form the hot junction tip 19. A coiled spring 20 encircles the shell and is confined between an outwardly-extending flange 21 welded to the shell and the bottom wall of a bayonet cap 22 slidably carried by the shell. The cap normally abuts against a collar 23 which is secured to the shell and the sheath.

FIGURE 3 shows the thermocouple of FIGURE 2 connected in operative position to the mounting block 10, the bayonet cap 22 being mechanically-coupled to the fitting 12 by means of the pin 14. The spring is compressed, thereby pressing the hot junction tip 19 against the wall defining the bottom of the bore 11. At the same time, the spring applies a pressure between the slotted wall of the cap and the pin 14, thereby to retain the cap and fitting in the coupled condition. Since the spring has fixed maximum and minimum lengths, it is apparent that the tip 19 will engage the bottom wall of the bore only when the maximum depth of the bore is less than the maximum (uncompressed) length of the spring. Thus, if the bore has an extended depth, the thermocouple tip will be spaced from the bottom of the bore, both of these conditions being indicated by the dotted lines in FIGURE 3. It is desirable that the thermocouple tip, forming the hot junction, be retained in firm engagement with the bottom wall of the bore in order to provide a rapid response to changes in the temperature of the mounting block. The depth of the bore plus the external length of the fitting 12 (FIGURE 3) commonly is referred to as the immersion length. It is apparent, therefore, that a particular spring-loaded thermocouple is adapted for use over a limited range of immersion lengths. This limitation restricts the applications to which such thermocouple can be applied and requires the manufacturer to carry a stock of thermocouples which differ only in the specified immersion lengths.

A spring-loaded thermocouple, made in accordance with one embodiment of this invention, is shown in FIGURE 4. The bayonet cap 22' is provided with internal threads 25 having a diameter and pitch corresponding substantially to the spring 26. The spring, passing through the cap, forms a thread for the cap and is confined between the shell flange 21' and the end of the flexible sheath 17. By rotating the cap relative to the spring, the user can position the cap at a desired point along the spring, which point corresponds to a desired thermocouple immersion length. When a relatively short immersion length is required, the cap is threaded forwardly toward the tip 19', whereby the effective length of the spring comprises that portion lying between the flange 21' and the threaded portion of the cap. The position of the cap is selected so that the effective spring length will result in the pressing of the tip against the bottom wall of the bore when the cap is coupled to the fitting. At the same time, the pressure of the spring retains the cap and fitting in the coupled condition. For a maximum immersion length, the cap is threaded to a position proximate to the sheath, as shown by the dotted lines. In this position of the cap, the immersion length of the thermocouple is somewhat less than the length of the outer sell 27, inasmuch as the spring must be compressed to a certain extent in order to retain the thermocouple tip in firm engagement with the bottom wall of the bore. In any event, by providing a construction which affords adjustment of the effective spring length, a particular thermocouple will have a range of immersion lengths considerably greater than that of thermocouples constructed as heretofore.

Reference now is made to FIGURE 5, which shows a spring-loaded thermocouple made in accordance with another embodiment of this invention. In this construction, one end of the spring 30 is anchored in place by threading several end convolutions thereof about the flexible sheath 17, such sheath being of conventional construction, with adjacent convolutions spaced by portions 31 of reduced diameter. The spring passes through the threaded portion of the cap 22', as has already been described, and the other end of the spring is free. In this arrangement, the effective length of the spring comprises that portion lying between the threaded portion of the cap and the sheath. For a particular immersion length, the cap is positioned along the spring so that the effective portion of the spring is under tension when the cap is coupled to the fitting. Although this construction may be utilized with a thermocouple having a hot junction tip 19', as shown in FIGURE 4, it is particularly adapted for use with thermocouples having a tapered tip 32. Such thermocouples are designed for immersion in fluids and generally have relatively long immersion lengths.

Reference now is made to FIGURES 6 and 7, which show a drawn metal bayonet cap 33. Such cap includes an integral shank 34 of extended length, with a plurality of radially-extending detents 35 formed in the wall thereof. These detents are spaced from each other longitudinally of the shank by a distance somewhat greater than the diameter of the particular spring 37. Actually, only three detents are required, such detents being spaced, circumferentially, 120 degrees apart.

Having now described the invention, those skilled in this art will be able to make various changes and modifications without thereby departing from the spirit and scope of the invention as recited in the following claims.

I claim:
1. A spring-loaded thermocouple of the class comprising a coiled spring and a bayonet cap carried by a tubular shell, said thermocouple being characterized in that the cap is threaded onto the spring.
2. In a spring-loaded thermocouple comprising a coiled spring and a bayonet cap carried by a tubular shell, the improvement comprising internal thread elements formed in the cap and in thread-like engagement with the spring convolutions.
3. A thermocouple comprising,
  (a) a pair of thermocouple wires disposed in a tubular shell and terminating in a hot junction tip,
  (b) a coiled spring encircling the said shell, and
  (c) a bayonet cap encircling said spring, said cap having internal thread elements engaging at least one convolution of the spring, the recited arrangement being such that the cap is displaceable along the spring upon relative rotation of the cap and spring.
4. The invention as recited in claim 3, including an external flange formed on the shell proximate to the said tip, and wherein one end of the spring abuts against the said flange.
5. The invention as recited in claim 3, including means securing one end of the spring to the end of the shell remote from the said tip.
6. A thermocouple comprising,
  (a) a pair of thermocouple wires disposed in a tubular shell and terminating in a hot junction tip,
  (b) a flexible sheath secured to the end of said shell remote from the said tip,
  (c) a bayonet cap carried by the shell and having an internally-threaded portion, and
  (d) a coiled spring encircling the shell and passing through the cap with at least one spring convolution in thread-like engagement with the said threaded portion.
7. The invention as recited in claim 6, wherein one end of the spring is secured to the said sheath.
8. The invention as recited in claim 6, including an external flange formed on the shell, and wherein the spring has a length substantially equal to the distance between the said flange and sheath.
9. The invention as recited in claim 6, wherein the said cap includes a tubular shank and wherein the said threaded portion comprises radial detents formed in the wall of said shank.

References Cited
UNITED STATES PATENTS

| | | | |
|---|---|---|---|
| 2,476,099 | 7/1949 | Knudsen | 338—28 |
| 2,379,317 | 6/1945 | Picciano | 136—221 X |
| 2,988,717 | 6/1961 | Bergsma | 338—30 |

WINSTON A. DOUGLAS, Primary Examiner

M. J. ANDREWS, Assistant Examiner